Sept. 11, 1951          O. M. BUNDY          2,567,635

WIRE-DRAWING MACHINE MOTOR CONTROL

Filed Oct. 16, 1948          3 Sheets—Sheet 2

INVENTOR.
Oswald M. Bundy
BY Harry P. Canfield
ATTORNEY

Patented Sept. 11, 1951

2,567,635

UNITED STATES PATENT OFFICE 2,567,635

WIRE-DRAWING MACHINE MOTOR CONTROL

Oswald M. Bundy, Cleveland, Ohio, assignor to The Clark Controller Company, Cleveland, Ohio, a corporation of Ohio Application October 16, 1948, Serial No. 54,977

4 Claims. (Cl. 318—7)

This invention relates to electric motor controls for controlling a plurality of motors concurrently; and relates particularly to controls for the motors of a multiple-die block wire drawing machine.

Wire drawing machines of the class referred to here comprise a sequence of wire drawing die blocks of successively smaller die hole diameter through all of which in series, wire stock is threaded and then continuously drawn to successively, or by stages, reduce it in diameter to the final desired size.

The main elements of such a wire drawing machine as conventionally arranged are illustrated diagrammatically, in Fig. 1.

The wire 1 is pulled through the first die block 2, by a reel or capstan 6 upon which a few turns of the wire are wound to give traction; the capstan being rotatably driven by a direct current electric motor 10. The wire is unwound from the capstan 6 and drawn in a loop 14 over a dancer roll 17, and over a stationary guide roll 20 and through the second die block 3 by a second capstan 7 driven by a second motor 11.

Similarly, the wire is drawn through the succeeding die blocks 4 and 5 and looped as at 15 and 16 over dancer rolls 18 and 19, and over stationary guide rolls 21 and 22 by capstans 8 and 9, driven by motors 12 and 13, the last capstan 9 being in the form of a reel upon which the finished wire is wound and accumulated in a bundle.

The motors 10—11—12—13 have series fields 23, 24, 25, and 26 and shunt fields 27, 28, 29, and 30. The speed of the motor 13 for the last capstan or reel 9 is usually controlled, or set, by hand manipulation of a field rheostat comprising a movable contact 38 and a shunt field resistor 34. The respective speeds of the motors 10—11—12 are regulated by the dancer rolls 17—18—19 respectively, controlling field resistors 31—32—33, by moving contacts 35—36—37 thereover as the lengths of the dancer roll loops 14—15—16 change or tend to change, thereby cutting resistance into the respective shunt field circuits to speed up the respective motors, when the loop tends to shorten, and vice versa, in each case. Thus the successive capstans 6, 7, 8, and 9 are driven at successively higher speeds and these speeds regulated to correct values to compensate for the successively increasing length of the wire caused by its reduction in diameter at each die and to prevent accumulation of slack between successive dies.

It is customary as referred to, to utilize direct current motors having both shunt and series fields for driving the capstans; and in some cases a machine may have as many as five or six motors; and various controls have been proposed for the motors. To render the operation of the machine reliable, efficient and safe, such controls must include among other features, means for starting all of the motors simultaneously and bringing them up to their respective speeds; and means for jogging them that is starting and stopping them intermittently at low speed, to facilitate threading the wire through the successive dies at the beginning of a drawing operation and for other purposes; or running them at low speed to give time to observe that the machine will operate as intended, if accelerated to high production speed; and means for quickly stopping all of the motors whenever desirable.

Commerce demands a machine that can be used for drawing wire of a wide range of sizes on different production jobs; for example as large as ¼ inch diameter and as small as No. 12 gage; and demands also that the operative speed of the machine be as high as possible for each size and still do good work.

These requirements have led to difficulties in the conventional machine controls.

In the conventional controls, upon starting up the motors, series starting resistance has been utilized in the usual manner, and cut out by steps to accelerate the motors. To provide the aforesaid jogging, the acceleration has been prevented from proceeding and some of the starting resistance maintained in the circuit, predetermined in amount to give jogging or low speed running.

If the production job is one of large diameter wire requiring the development of high motor torque for pulling it through the respective dies, at low speed, and the said jogging resistance is predetermined for that case, then it will not be possible with the same resistance to run at low starting or jogging speed, in the case of small wire requiring little torque.

Or if the starting resistance is predetermined for the small torque of a small wire job, and so that it can give a low starting speed, then on a large wire job, the machine will stall and not start.

It has been found to be necessary therefore to experimentally change the starting resistance to adapt it to different production jobs. This is objectionable because it is often not skillfully done; and when, in the case of going from large wire to small wire, the change is not made at all due to neglect or inadvertence, the machine may at the start immediately and unexpectedly come up to a high speed. Besides being objectionable, this may endanger the operator who may be adjusting the dies or threading the wire through them and who expected the machine to start and run at a low jogging or inching speed.

It is one of the objects of this invention to eradicate this objectionable feature; and to provide a control for the motors by which during jogging operation or during a timed acceleration period, the motors are caused to develop sufficient torque to start under large loads including the maximum encountered load, but are prevented from exceeding a predetermined relatively low speed at small loads including the minimum encountered load.

Again, in the conventional controls for machines of the class here considered, provision has been made for stopping the machine by dynamic braking of the motors. In general, in such prior controls, the armatures of the motors are connected in local circuits containing braking resistance. The resistance is cut out by steps. Then as a final step of braking, the shunt fields are given full energization. Up to the final step the shunt field strength of the respective motors is regulated by the dancer operated rheostats (referred to in connection with Fig. 1) so that as the motors slow down under the dynamic braking action, their correct relative individual speeds are maintained. But at the final step with full shunt field strength on all of the motors, this speed regulation obviously is lost.

This conventional braking control is not satisfactory because the motors are not stopped in a sufficiently short interval of time for safety in cases of emergency. The motors cannot be permitted to run at any considerable speed without the said dancer rheostat regulation, and therefore the speed must be greatly reduced before the dancer rheostat control is superseded by full field strength; but as is well known dynamic braking diminishes as the speed falls; so that a long interval elapses before the motor speed falls to a value at which the last step of braking can be applied.

It is therefore a further object of this invention to provide an improved braking control for the motors of such a machine which will stop them in a shorter interval of time than heretofore possible and without losing regulation of their relative individual speeds.

Other objects of the invention will become apparent hereinafter to those skilled in the art.

The full control of the motors of the machine briefly described hereinbefore, may be considered as comprising jogging or inching, that is, starting and stopping intermittently without attaining more than a low speed, and continuous running at low jogging speed; stopping while jogging; accelerating up to full production speed and running at that speed; and stopping while running at full speed.

An embodiment of the invention in which these functions are performed in an improved manner as referred to is fully disclosed in the following description taken in connection with the accompanying drawing, in which.

Figure 4:
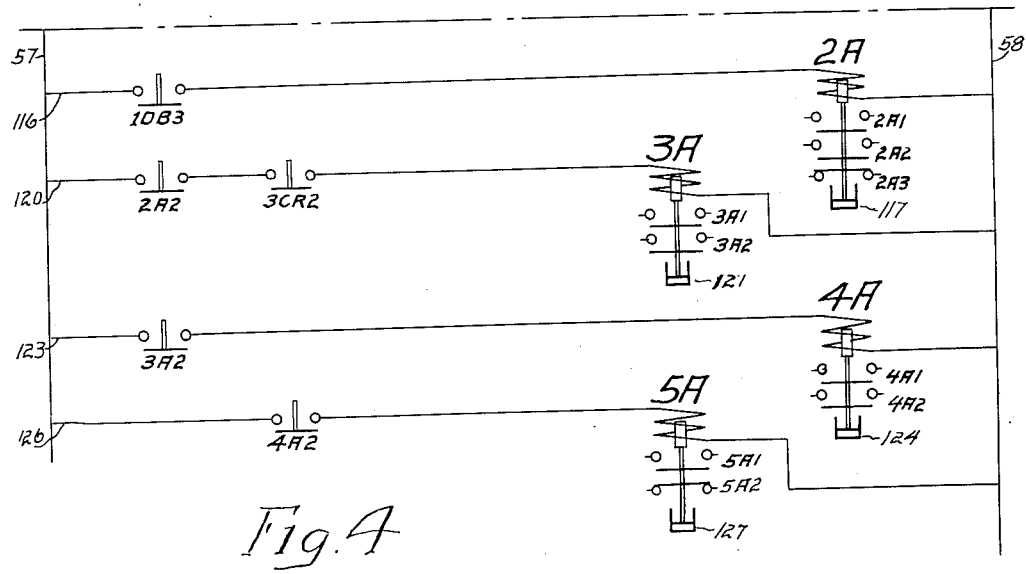
Fig. 4 is a diagrammatic view to be taken together with Fig. 3 and illustrating the rest of the control system.
Figure 2:
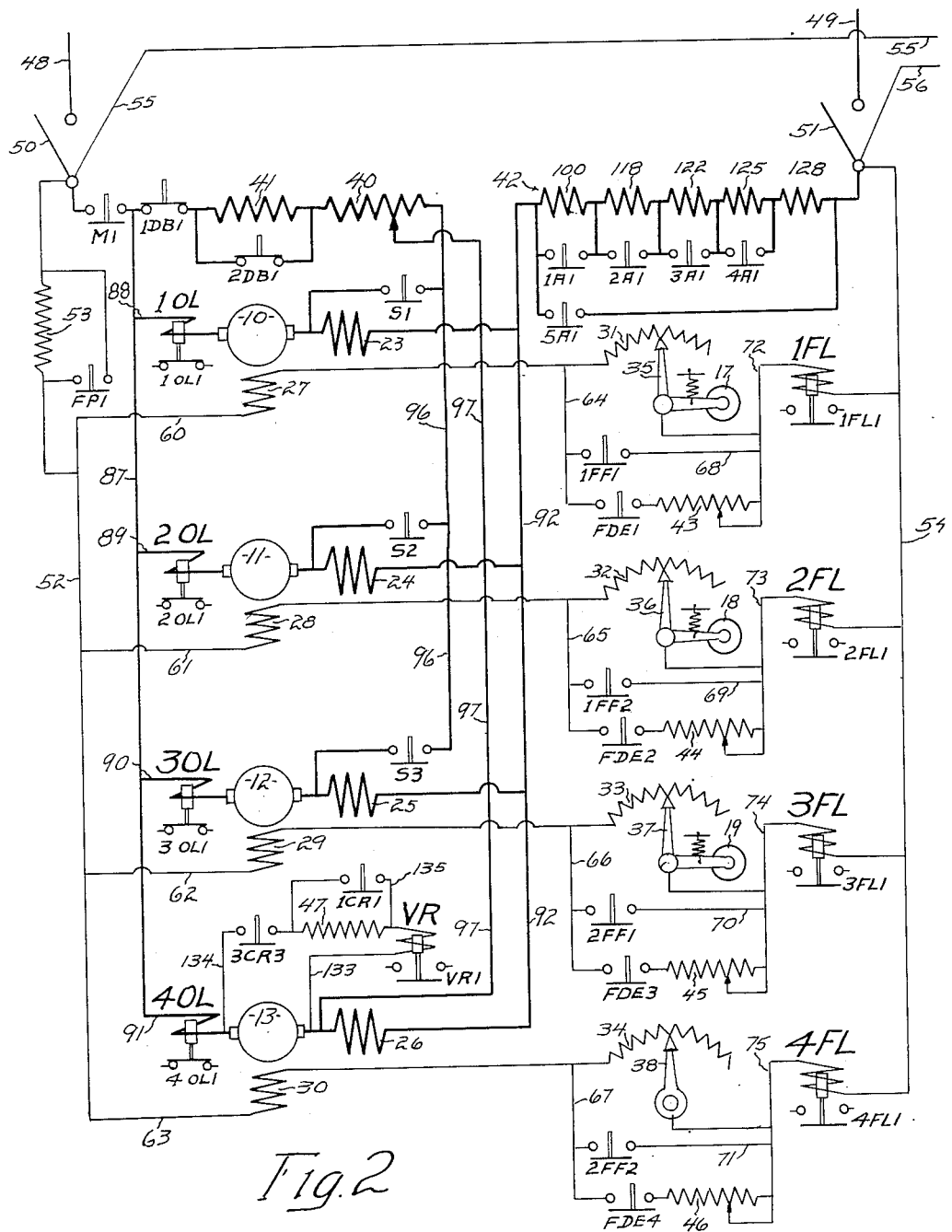
Fig. 2 is a diagrammatic view illustrating the complete circuits of the several motors, and contacts and contactors controlling them.
Figure 3:
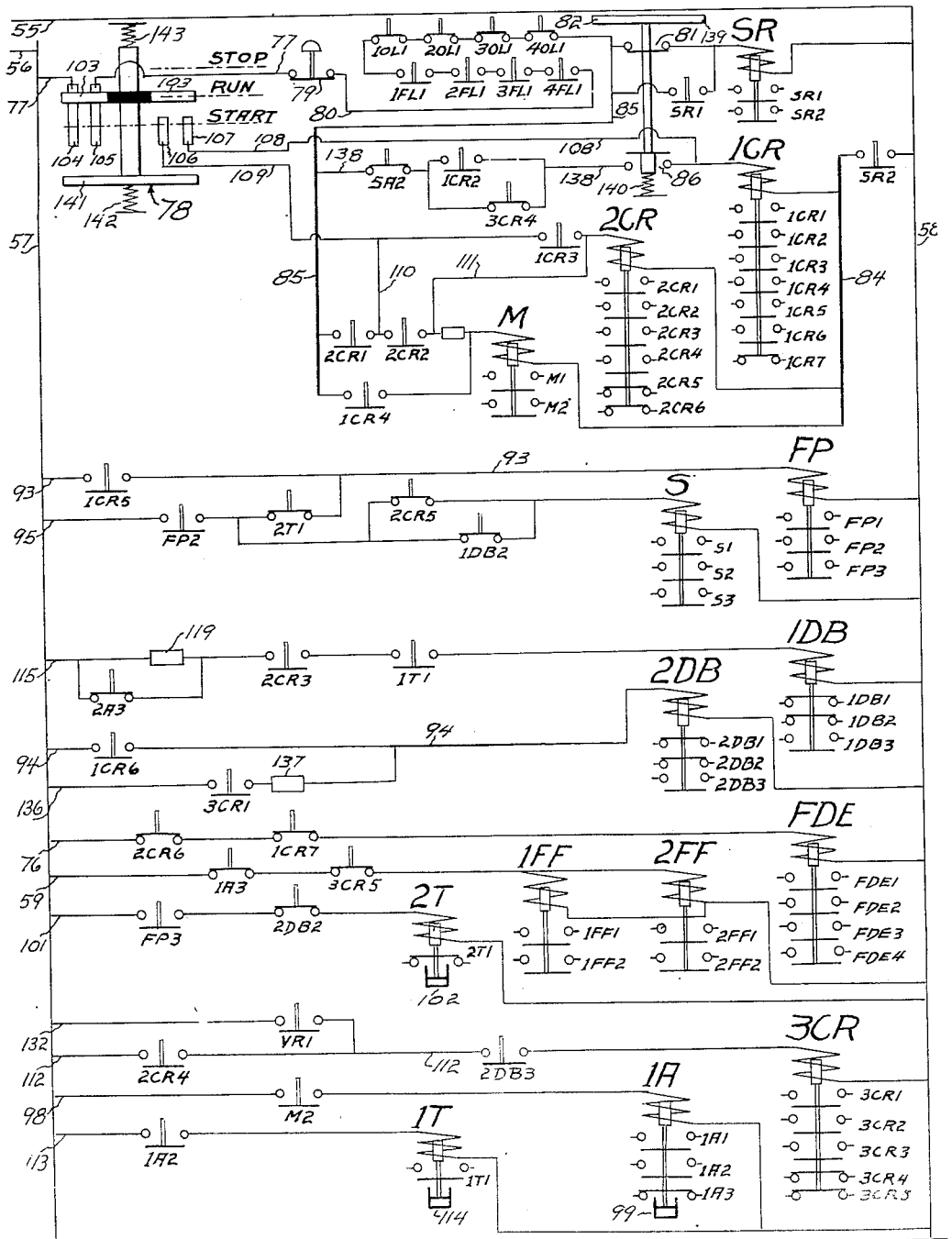
Fig. 3 is a diagrammatic view illustrating part of a control system for the contactors and contacts of Fig. 2.

In Figs. 2, 3, and 4, there are a number of electromagnetic contactors comprising each a winding and a plunger and a number of double break contacts operated thereby. Some of the contacts are closed and some are open, when in normal condition, that is when the windings are de-energized; and the entire system is illustrated with the parts in normal unenergized condition.

To simplify the drawing so that the various electrical circuits may be represented in the so-called "across-the-line" type of diagram, adopted by engineers generally, each contactor is shown complete as having all of its contacts associated with it unitarily, but with the circuit connections to the contacts shown fragmentarily and broken off; and each of these contacts is reproduced fragmentarily elsewhere in the diagram with the complete circuit connections thereto.

In Fig. 2, the contactors and their contacts are as follows:

Contactors 1FL, 2FL, 3FL, and 4FL, each having respectively one pair of open contacts 1FL1, 2FL1, 3FL1, and 4FL1.

Contactors 1OL, 2OL, 3OL, and 4OL, each having respectively one pair of closed contacts 1OL1, 2OL1, 3OL1, and 4OL1.

Contactor VR having one pair of open contacts VR1.

In Fig. 3, the contactors and their contacts are as follows:

Contactor SR having open contacts SR1 and SR2.

Contactor 1CR having open contacts 1CR1, 1CR2, 1CR3, 1CR4, 1CR5, and 1CR6, and closed contacts 1CR7.

Contactor 2CR having open contacts 2CR1, 2CR2, 2CR3, and 2CR4, and closed contacts 2CR5 and 2CR6.

Contactor M having open contacts M1 and M2.

Contactor FP having open contacts FP1, FP2, and FP3.

Contactor S having open contacts S1, S2, and S3.

Contactor 1DB having closed contacts 1DB1, 1DB2, and open contacts 1DB3.

Contactor 2DB having closed contacts 2DB1, 2DB2, and open contacts 2DB3.

Contactor FDE having open contacts FDE1, FDE2, FDE3, and FDE4.

Contactor 1FF having open contacts 1FF1 and 1FF2.

Contactor 2FF having open contacts 2FF1 and 2FF2.

Contactor 2T having one pair of closed contacts 2T1.

Contactor 3CR having open contacts 3CR1, 3CR2, 3CR3, and closed contacts 3CR4, and 3CR5.

Contactor 1A having open contacts 1A1, 1A2, and closed contacts 1A3.

Contactor 1T having one pair of open contacts 1T1.

In Fig. 4 the contactors and their contacts are as follows:

Contactor 2A having open contacts 2A1, 2A2, and closed contacts 2A3.

Contactor 3A having open contacts 3A1 and 3A2.

Contactor 4A having open contacts 4A1 and 4A2.

Contactor 5A having open contacts 5A1 and closed contacts 5A2.

Figure 1:
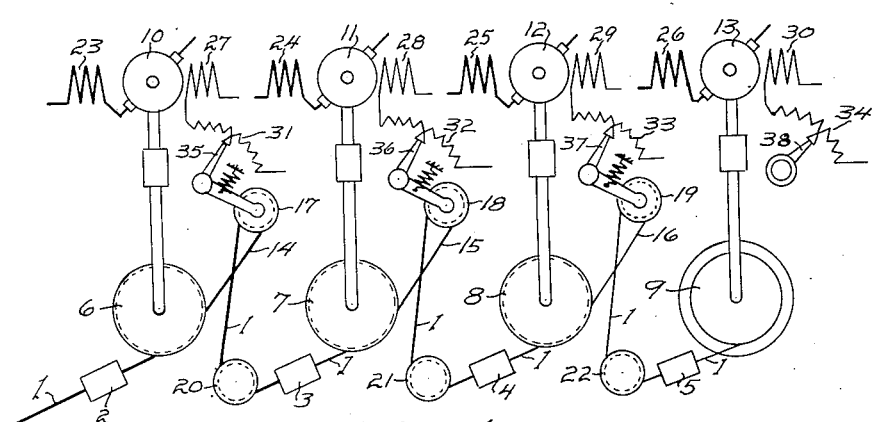
Fig. 1 is, as referred to hereinbefore, a diagrammatic view, illustrating the main elements of a motor driven wire drawing machine of conventional arrangement, with incomplete circuits for the motors thereof.

In Fig. 2, the motors, series fields, and shunt fields of Fig. 1 are reproduced, identified at 10—11—12—13; and 23, 24, 25, 26; and 27, 28, 29, 30, respectively.

The respective shunt field resistors 31, 32, 33, and 34, and the respective dancer roll operated contact arms 35, 36, 37, and a manually operable arm 38 for the resistors are also reproduced from Fig. 1.

In Fig. 2 at 40 and 41 are resistors to be described; at 42 is motor accelerating resistance. Associated with the dancer roll resistors are supplemental resistors 43, 44, 45, and 46; and associated with the motor 13 is a resistor 47.

The circuit connections of Figs. 2, 3, and 4 and other parts thereof not above identified will be described in connection with a description of the operation of the system as a whole which now follows.

*Make-ready conditions*

In Fig. 2, direct current potential is supplied by mains 48—49. Upon closing connecting switches 50—51, a shunt field main 52 is connected to the supply main 48 through a common field resistor 53, and a shunt field main 54 is connected directly to the main 49.

Wires 55—56 of Fig. 2, continued in Fig. 3, supply potential to control mains 57—58 of Figs. 3 and 4.

In Fig. 3, current immediately flows from control main 57 by wire 59, through closed contacts 1A3 and 3CR5 through the windings of contactors 1FF and 2FF, to control main 58, thereby closing contacts 1FF1, 1FF2, 2FF1, and 2FF2.

In Fig. 2, the closing of these contacts causes shunt field current to flow through the shunt fields as follows: from main 48 through resistor 53 to main 52, thence by wires 60—61—62—63, through the fields 27—28—29—30 by wires 64—65—66—67, through the closed contacts 1FF1—1FF2—2FF1—2FF2, by wires 68—69—70—71, to wires 72, 73, 74, 75, through the windings of contactors 1FL—2FL—3FL—4FL, to main 54.

The shunt fields are thereby all given partially full strength determined by the resistor 53.

In Fig. 3, current also immediately flows by wire 76 between control mains 57—58, through closed contacts 2CR6 and 1CR7, through the winding of contactor FDE and it operates closing its contacts FDE1 to FDE4 but nothing is actuated at this time, since these contacts in Fig. 2 are bridged by wires 68—69—70—71.

In Fig. 2, the field current energizing the windings of contactors 1FL—2FL—3FL—4FL, operates them closing their contacts 1FL1—2FL1—3FL1—4FL1.

In Fig. 3, therefore, current flows from control main 57 by wire 77 through a controller 78 to be described, through the closed contacts of a safety switch 79, by wire 80, through all of the closed contacts 1FL1—2FL1—3FL1—4FL1, in series, through the closed contacts 1OL1, 2OL1, 3OL1, 4OL1, in series, through the closed contacts 81 of a manual or pedal jogging contactor 82, through the winding of contactor SR, to main 58.

Contactor SR operates and closes its contacts SR1—SR2. Contacts SR1 put a bridge around the jogging contacts 81 as a maintaining circuit for contactor SR. Contacts SR2 connect a supplemental main 84 to the main 58; another supplemental main 85 being connected to the other main 57 through the above described series of eight contacts 1OL1 to 4OL1 and 1FL1 to 4FL1 and lines 80 and 77.

The shunt fields of the motors are now energized, but through the resistor 53 and to less than full across-the-line energization; and the system is now in alerted condition ready to be operated.

*Jogging operation*

It is one of the improvements effected by this invention as referred to, to cause the motors to develop high torque but to prevent their attaining high speed, when starting from rest and while jogging, that is intermittently starting and stopping for setting up purposes, etc., or running at low speed preparatory to accelerating to high production speed.

For jogging operation, the manual or pedal contactor 82 Fig. 3 is operated to start, and restored to stop; and may be operated to start and stop intermittently; or may be held operated for continuous running at reduced speed.

The following events occur upon pushing the jogging contactor 82 downwardly, and holding it down.

Main current is supplied to the motors 10—11—12—13 and to their series fields 23 to 26, with motor accelerating resistance 42 all in the circuit.

The shunt fields 27 to 30 are given full energization across the supply line.

An armature shunt circuit is closed around the armature of each motor through resistance 40—41.

After a predetermined time interval, a first step of the accelerating resistance 42 is cut out; the shunt fields are then reduced from full strength to that of the dancer roll rheostat resistors 31 to 34, and put under control of the dancer rolls.

The circuits and controls for effecting these events are as follows.

In Fig. 3, upon pushing jog contactor 82 downward, upper contacts 81 open and lower contacts 86 close. Supplemental mains 85—84 are already connected as described to control mains 57—58 respectively.

Current flows from supplemental main 85, in line 138, through contacts 5A2, 3CR4, contacts 86, winding of contactor 1CR, to supplemental main 84, operating contactor 1CR, and closing contacts 1CR1 to 1CR6 and opening contacts 1CR7.

Current flows from supplemental main 85 through now closed contacts 1CR4, through winding of contactor M to supplemental main 84, operating contactor M, closing its contacts M1 and M2.

In Fig. 2, closing of contacts M1 connects the supply line 48 to a motor main 87, and main armature current flows therefrom by wires 88—89—90—91 through the windings of overload contactors 1OL—2OL—3OL—4OL (whose contacts normally remain closed), through the motor armatures 10—11—12—13, and their series field windings 23 to 26, to a motor main 92, and thence through accelerating resistance 42 to the supply line 49.

In Fig. 3, current flows between the control mains 57—58 in line 93 through now closed contacts ICR5 and through winding of contactor FP operating it and closing its contacts FP1 to FP3.

In Fig. 2, closing of contacts FP1 cuts out the resistor 53 from the circuit of the field windings. The contacts IFF1, IFF2, 2FF1, and 2FF2 being closed, the fields are now energized to full across-the-line strength.

In Fig. 3 current in line 94 flows through now closed contacts ICR6 and through winding of contactor 2DB and it operates opening its contacts 2DB1 and 2DB2, and closing contacts 2DB3.

In Fig. 2 opening of contacts 2DB1 removes a bridge from around resistor 41, and puts both sections of resistance 40—41 in series.

In Fig. 3, current in line 95 flows through now closed contacts FP2 and through either closed contacts 2CR5 or IDB2 and through winding of contactor S, operating it and closing its contacts S1 to S3.

In Fig. 2, closing of contacts S1, S2, S3 connects the right hand side of the respective motors 10—11—12 to an armature shunt main 96 which is connected to one end of resistance 40—41 the other end being connected through closed contacts IDB1 to the motor main 87; thus establishing an armature shunt around each of these motors. The motor 13 has a similar armature shunt by means of a wire 97 from its right hand side to a point on the resistor 40.

In Fig. 3 current in line 76 is interrupted by opening of contacts ICR7, and winding of contactor FDE is de-energized and its contacts restored; and in Fig. 2, this opens contacts FDE1 to FDE4 which again is an idle operation for these contacts.

In Fig. 3, in line 98 contact M2 is closed and winding of contactor 1A is energized. This contactor is delayed in operation by any suitable or well known design as symbolized by a dash-pot 99. At the end of its time interval it operates and closes contacts 1A1—1A2 and opens contacts 1A3.

In Fig. 3 in line 59, opening of contacts 1A3 de-energizes contactors IFF and 2FF opening their contacts and in Fig. 2 contacts IFF1, IFF2, 2FF1, and 2FF2 accordingly open.

The shunt field current is thereby reduced to less than full strength by having to flow through the resistors 31 to 34 and the motors 10—11—12 are subjected to field control at the dancer roll resistors 31 to 33 as described.

In Fig. 2, when contacts 1A1 close, they cut out the first step 100 of starting resistance 42.

On jogging operation, therefore, the motors start each with a full strength shunt field, and with an armature shunt and therefore develop great torque for heavy starting load, but are held from accelerating to high speed on light load, by the series starting resistance 42. After a time interval, the shunt fields are reduced to a lower value and put under the control of the dancer rolls, and a step of the starting resistance is cut out. The motors will then run at reduced speed so long as the manual switch 82 is held down.

*Stopping during jogging*

To stop during jogging, or low running speed operations, the following events are caused to occur.

The main current to the motors is cut off, and dynamic braking circuits are made for their armatures. Resistance for the braking circuits is the same resistance as was used for the armature shunts above described; but a step of it is cut out to increase the braking effect.

The shunt fields are full strength during this dynamic braking.

This is accomplished as follows:

The manual or pedal switch 82 in Fig. 3 is restored and returns to normal, closing contacts 81 and opening contacts 86.

This opens line 138 and de-energizes contactor ICR. Contacts ICR4 open and de-energize contactor M, and the latter, in Fig. 2 opens M1 and breaks the main motor supply current to the main 87.

In Fig. 3, line 94 is opened by opening of ICR6 and de-energizes contactor 2DB, which closes contacts 2DB1 and in Fig. 2 these contacts cut out resistor section 41.

In Fig. 3, line 98, when contacts M2 opened, they de-energized contactor 1A and is closed its contacts 1A3 in line 59 which operated contactors IFF and 2FF, and in Fig. 2, their contacts IFF1, IFF2, 2FF1, and 2FF2 close and short out the field resistors 31 to 34.

In Fig. 3, line 76 is closed by closing of contacts ICR7 and contactor FDE is operated thereby closing its contacts FDE1 to FDE4; but in Fig. 2, the closing of these contacts is an idle operation, contacts IFF1, IFF2, 2FF1, and 2FF2 being closed.

In Fig. 3, line 93, contacts ICR5 open but contactor FP is still held operated by current in line 95 through maintaining contacts FP2 and contacts 2T1 and then in line 93 through winding of contactor FP; so that in Fig. 3 in line 101 contacts FP3 are closed, and contacts 2DB2 being closed, current flows in line 101 and energizes a timing contactor 2T starting its time interval, it being a delayed operation contactor as symbolized by the dash-pot 102.

In line 95, contacts FP2 being closed, current in line 95 through contacts FP2 and 2CR5 (or IDB2) energizes contactor S so that in Fig. 2 its contacts S1, S2, and S3 are closed and complete a dynamic braking circuit for the motors 10—11—12 through these contacts to main 96, through resistor 40, closed contacts 2DB1, contacts IDB1, main 87 and back to the motors; and motor 13 has its own similar braking circuit through main 97 and a part of resistor 40 and therefore a greater braking effect than that on the motors 10—11—12.

In Fig. 2, contacts FP1 being closed, the field resistor 53 is cut out.

The motors are thus dynamically braked by strong armature current, limited by only one section 40, of braking resistance, and by shunt fields of full across-the-line strength.

It is to be understood that the speed of the motors when braking began, was, at most, the low jog running speed and that they will be quickly brought to rest.

In any event, however, the time interval of contactor 2T is running; and, by adjustment, it is preferably timed so as not to fully operate until the motors have stopped. When it operates its opens 2T1, and restores the system to make-ready condition.

In Fig. 3, line 95—93, opening of contacts 2T1 de-energizes contactor FP and it restores opening contacts FP2 and then in line 95 de-energizes contactor S and it restores.

In Fig. 2, opening contacts FP1 puts the common field resistor 53 in the field circuit; and opening of contacts S1 to S3 removes the armature shunt and dynamic braking circuits.

In Fig. 3, line 101, opening contacts FP3 de-energizes contactor 2T and it restores closing its contacts 2T1, but in line 95—93 this cannot again operate contactor FP or contactor S because contacts FP2 are open. The system is thus restored to normal or make-ready conditions.

*Full speed running*

In Fig. 3 the controller 78, which may be of any suitable construction, but is illustrated diagrammatically, comprises a pair of contacts 103—103 which are normally in a "Run" position. In operation they are movable to a "Start" position and then to "Run" position, and from "Run" position to "Stop" position; and the controller comprises contacts 104—105 connected by one contact 103 in both the "Run" and "Start" positions, and stationary contacts 106—107 connected by the other contact 103 in only the "Start" position.

For the above described jogging operation, intermittent or slow speed running, the line 77 is energized through the connected contacts 104—105.

For full speed running, the operator pushes the jog contactor 82 down, if it is not already down, and while holding it down, moves the controller to the "Start" position and then restores the contactor 82, and then moves the controller to the "Run" position.

In the above described jogging operation, running at low speed, only one of the accelerating contactors 1A operated, cutting out only the starting resistance section 100 in Fig. 2. To accelerate the motors to full speed, the other accelerating contactors 2A to 5A are operated successively as will be described. Before this can take place, as will become clear later, contactor 2CR of Fig. 3 must be operated and the timer 1T in line 113 of Fig. 3 must have run its interval; because as will be described, the successive accelerating contactors 2A to 5A of Fig. 4 are all dependent for operation upon the operation of contactor 2A; and contactor 2A cannot operate until contactor 1DB has operated as shown in Fig. 4 line 116; and in Fig. 3, line 115, contactor 1DB is shown to be dependent upon the closure of contacts of contactors 2CR and 1T.

By this means, it is insured that the conditions of high torque and limited speed of the jogging circuits, and the advantages thereof, will be imposed upon the motors before they can be accelerated to full speed. The timer 1T is preferably adjusted for a time interval such that if the operator sets the system for full speed running, acceleration to the full speed is delayed by the timer 1T until the motors are brought up to their continuous running low speed under jogging conditions of high torque and limited speed.

In accordance with the above outline for full speed operation the following events occur.

The events for continuous running at jogging low speed first occur, if they have not already occurred.

Then the armature shunt circuits are opened; and the accelerating resistance is cut out in successive timed steps.

This is accomplished as follows, assuming that the jogging operation has not been performed.

In Fig. 3, contactor 82 is moved down and held down, contactor 1CR is thereby operated by current flowing between supplemental mains 85 and 84 through line 138 and contacts 5A2, 3CR4, and 86.

With contactor 82 held down, and controller 78 moved to "Start" position, current flows from supplemental main 85 through contacts 5A2, 3CR4, contacts 86, a wire 108, connected controller contacts 106—107, a wire 109, contacts 1CR3, winding of contactor 2CR, to supplemental main 84, operating contactor 2CR and closing contacts 2CR1 to 2CR4, and opening contacts 2CR5 and 2CR6.

The operator while holding contactor 82 down, moves the controller 78 to the "Run" position, opening the line 108—109.

Contactors 1CR and 2CR are now both in operated condition; and contactor 1CR will presently be de-energized and restored by the movement of controller 78 to the "Run" position, which will open the line 108—109 at the controller contacts 106—107. After contactor 1CR is thus restored, contactor 2CR will be held operated between mains 85—84 by current through contacts 2CR1 and 2CR2 and a wire 111.

For the present, with contactors 1CR and 2CR both operated, in Fig. 3, line 93, contactor FP is energized through closed contacts 1CR5 and operates, and when contactor 1CR is presently restored, opening contacts 1CR5, contactor FP will be held energized by current in line 95 through its own contacts FP2 and contacts 2T1 and continuation of line 93; and in Fig. 2, the field resistor 53 is kept cut out by contacts FP1.

In Fig. 3, line 94, contacts 1CR6 being closed, contactor 2DB is energized and opens its contacts 2DB1 and 2DB2 and closes 2DB3.

In Fig. 3, line 112, contacts 2CR4 and 2DB3 being closed, contactor 3CR is energized and closes its contacts 3CR1 to 3CR3 and opens 3CR4 and 3CR5.

In Fig. 3, line 136, contacts 3CR1 are now closed and current flows through a maintaining resistor 137 to line 94 and thence through winding of contactor 2DB, maintaining it operated.

The operator now moves the controller, as aforesaid to the "Run" position, de-energizing and restoring contactor 1CR, opening contacts 1CR1 to 1CR6 and closing 1CR7; and in line 112, contacts 2DB3 being maintained closed, contactor 3CR is held operated.

In Fig. 3, line 95, contacts FP2 and 1DB2 are closed and contactor S is energized and in Fig. 2, the contacts S1, S2, and S3 close, putting the armature shunts around the motors.

In Fig. 3, contactor M is held operated by current through contacts 2CR1 and 2CR2; and in Fig. 2, contacts M1 being closed, main motor current flows to main 87 and through all of the motors 10 to 13 and their series fields 23 to 26 to main 92, and through accelerating resistance 42.

In Fig. 3, in line 76, contacts 2CR6 are open and contactor FDE opens its contacts so that in Fig. 2, contacts FDE1 to FDE4 are open.

In Fig. 3, line 115 is open at the contacts 1T1 and contactor 1DB is de-energized and in Fig. 2 contacts 1DB1 are closed.

In Fig. 3, line 59, opening of contacts 3CR5 de-energizes contactors 1FF and 2FF so that in Fig. 2 contacts 1FF1—1FF2—2FF1—2FF2 all open.

In Fig. 3, when contactor M operated, it closed contacts M2 in line 98 and started the time interval of contactor 1A; at the end of which it operates closing contacts 1A1—1A2 and opens 1A3.

In Fig. 2, contacts 1A1 cut out the first step 100 of starting resistance.

The motors now start and run under jogging conditions of high torque and limited speed if they had not already been doing so in a jogging operation, and are therefore now running with all of the accelerating resistance 42 in circuit, except the first section 100, and the shunt fields of the motors 10—11—12 are subject to the resistors 31—32—33 under dancer roll control, and the field of the motor 13 subject to hand rheostat control as described, and with the armature shunts around the motors.

It will therefore be seen that the motors are subjected to the conditions of jogging at continuous low speed, although the control is set for full speed.

In Fig. 3 line 113, contacts 1A2 energized contactor 1T and started its time interval, it being a delayed operation contactor as indicated by a symbolized dash-pot 114. At the end of its time interval it closes contacts 1T1 in line 115, and contacts 2CR3 being closed, the winding of contactor 1DB becomes energized and it operates closing contacts 1DB3 and opening contacts 1DB1 and 1DB2; and in Fig. 2, contacts 1DB1 open the armature shunt circuit.

In Fig. 3, line 95, contacts 2CR5 and 1DB2 are now both open and contactor S is de-energized and in Fig. 2 the contacts S1, S2, S3 all open.

In Fig. 4, line 116, closing of contacts 1DB3 energizes contactor 2A, a delayed operation contactor symbolized by a dash-pot 117, and it operates closing contacts 2A1, 2A2, and opening 2A3.

In Fig. 2, closing of contacts 2A1 cuts out another section 118 of accelerating resistance.

In Fig. 3, line 115, contacts 2A3 open but merely insert in the line, a holding resistor 119 and contactor 1DB stays operated.

In Fig. 4, line 120, closing of contacts 2A2, contacts 3CR2 being closed, energizes winding of contactor 3A, a delayed operation contactor symbolized by a dash-pot 121, and after its time interval it operates closing contacts 3A1 and 3A2.

In Fig. 2, contacts 3A1 cut out section 122 of accelerating resistance.

In Fig. 4, line 123, contacts 3A2 energize contactor 4A, delayed as symbolized by dash-pot 124, and it operates closing contacts 4A1 and 4A2.

In Fig. 2, contacts 4A1 cut out accelerating resistance section 125.

In Fig. 4, line 126, contacts 4A2 energize contactor 5A, delayed as by a symbolized dash-pot 127, and it operates closing contacts 5A1 and opening contacts 5A2.

In Fig. 2, contacts 5A1 cut out accelerating resistance section 128, and bridge all of the contactors 1A1, 2A1, 3A1, and 4A1.

The motors 10—11—12—13 are now all accelerated to full speed, and the fields of motors 10—11—12 are under control of the dancer roll operated resistors 31—32—33.

*Stopping on full speed running*

As referred to, it is one of the improvements effected by this invention to be able to stop all of the motors in a shorter time than has heretofore been possible in controls of this class.

In stopping, the motors are braked dynamically in two steps of braking action; and the shunt fields are given higher than normal energization under dancer roll control, and finally given full across-the-line energization.

To effect stopping at high running speed, the operator moves the controller 78 of Fig. 3 from the "Run" position to the "Stop" position, and the following events take place.

At this time, contactors 2CR, M, FP, 3CR, 1A, 2A, 3A, 4A, 5A, 1T, and 1DB of Figs. 3 and 4 are in operated condition; and also contactor VR of Fig. 2 is in operated condition by means to be described.

In moving the controller 78 to "Stop," contacts 104—105 are disconnected. This opens line 80 by which positive potential was impressed on supplemental main 85; and de-energizes contactor SR, which restores and opens contacts SR2 by which negative potential was impressed on supplemental main 84.

Contactors 2CR and M thus are de-energized and restore their contacts, opening contacts M1 and M2; and opening contacts 2CR1 to 2CR4 and closing contacts 2CR5 and 2CR6.

In Fig. 2, opening of contacts M1 cuts off the main current supply to the motors.

In Fig. 3, line 98, opening of contacts M2 restores contactor 1A and it opens contacts 1A1—1A2 and closes contacts 1A3.

In Fig. 3, line 115, opening of contacts 2CR3 restores contactor 1DB and it closes 1DB1, 1DB2, and opens 1DB3.

In Fig. 4, line 116, opening of 1DB3, restores 2A opening its contacts 2A1 and 2A2 and closing 2A3.

The opening of contacts 2A2 in line 120 starts the successive de-energization of contactors 3A, 4A, and 5A, as is believed will now be apparent, and together with the restoring of 1A and 2A as described, these contactors in Fig. 2 cut back in all of the resistance 42.

In Fig. 3, line 113, contactor 1T is restored upon opening of contacts 1A2, and opens its contacts 1T1.

In Fig. 2, when contacts 1DB1 closed, it closed the dynamic braking resistance circuit at that point.

In Fig. 3, line 95, when contacts 2CR5 closed, contacts FP2 being closed, contactor S operated, closing its contacts S1, S2, S3, which in Fig. 2 close dynamic braking circuits on the motors 10—11—12.

In Fig. 3, lines 136 and 94, contacts 3CR1 are closed and contactor 2DB is maintained operated so that in Fig. 3, line 112, although contacts 2CR4 have opened, contacts 2DB3 are closed and contactor 3CR is held operated by closed contacts VR1 in line 132 and closed contacts 2DB3 in line 112.

As to the contacts VR1 of line 132, these contacts are on contactor VR of Fig. 2, the winding of which is connected across the armature of the motor 13, by wires 133 and 134 through resistor 47 and through contacts 3CR3 normally open. Normally open contacts 1CR1 are in a bridge 135 around the resistor.

As above described in going to the "Start" position of the controller 78, Fig. 3, and then to the "Run" position, contactors 1CR and 3CR of Fig. 3 were for a while both closed; and contacts 3CR3 and 1CR1 of Fig. 2 both closed. This energized contactor VR and it operated closing its contacts VR1. Subsequently when container 1CR restored, opening contacts 1CR1, the resistor 47 was put in series with the winding of contactor VR, and this predetermines a motor voltage at which the contactor will restore and open contacts VR1, the preferred voltage being about 70 to 80 volts. With the motors running at full speed, the voltage holds contactor VR operated, and in Fig. 3, line 132, contacts VR1 closed, from which it is apparent that contactor 3CR will restore at the predetermined lower motor speed upon the opening of contacts VR1.

In Fig. 3, line 76, contacts 2CR6 and 1CR7 being closed, contactor FDE is operated and in Fig. 2, its contacts VDE1 to FDE4 close, putting the auxiliary field resistors 43 to 46 in parallel with the dancer roll controlled field resistors 31, 32, and 33, and the manually controlled resistor 34, respectively.

In Fig. 3, line 94, contactor 2DB is operated having been first operated by closure of 1CR6, and now held operated by closing of contacts 3CR1 in line 136; and in Fig. 2, the opening contacts 2DB1 cut in resistor 41.

In Fig. 3, line 59, contacts 3CR5 being open, contactors 1FF and 2FF are restored and in Fig. 2, their contacts 1FF1, 1FF2, 2FF1, 2FF2 are open.

The motors are thus dynamically braked with a first step of braking effect determined by the inclusion of both resistors 40—41 in the braking circuit.

The shunt fields are energized at an augmented or "forced" degree, to magnify the braking effect, but at the same time are kept under the regulating control of the dancer rolls; this being effected by shorting out the common resistor 53; and by paralleling the normal field resistors 31 to 34 by the resistors 43 to 46.

It has been found that by suitably predetermining the values of the resistors 43 to 45, with respect to the values of the resistors 31 to 33, the variation of the joint value of these parallel resistors by the dancer rolls will go on, and the field strength will be regulated in the normal manner by the dancer rolls, but at a forced or augmented field strength. A suitable relation of the two parallel resistors to effect this action is for each of the auxiliary resistors 43, 44, 45 to have a resistance value from 20% to 40% of that of the total resistance of the corresponding resistors 31, 32, and 33. The resistors 46 and 34 can suitably have a like relation.

The motors are therefore slowed down very rapidly and under dancer roll field regulation control. When the speed of the motor 13 reaches that at which its armature voltage is at some preselected value, say 70 to 80 volts as aforesaid, the contactor VR, in Fig. 2, restores and opens its contacts VR1.

In Fig. 3, line 132, these contacts VR1 upon opening de-energize contactor 3CR and it restores, opening contacts 3CR1 to 3CR3 and closing contacts 3CR4 and 3CR5 with the following effect.

In line 136, opening of contacts 3CR1 de-energizes contactor 2DB, and it restores closing its contacts 2DB1, 2DB2, and opening contacts 2DB3.

In Fig. 2, closing of contacts 2DB1, shorts out resistance 41 and gives a second step or increase to the dynamic braking current.

In Fig. 3, line 101, contacts FP3 are closed and contacts 2DB2, upon closing, energize timing contactor 2T and it starts its time interval.

In Fig. 3, line 59, contacts 1A3 are closed and contacts 3CR5 upon closing operate contactors 1FF and 2FF and in Fig. 2 their contacts 1FF1, 1FF2, 2FF1, and 2FF2, all close and short out the regulating resistances 31 to 34, and the augmenting resistances 43 to 46, giving full across-the-line strength to the shunt fields, and a further increase of dynamic braking effect on the said second step, bringing the motors to rest.

When the time of the timing contactor 2T has run, it restores the whole system to normal for another operation. It opens its contacts 2T1 in line 95 which de-energizes and restores contactor FP; and contacts FP2 of the latter in line 95 open and de-energize and restore contactor S; and contacts FP3 in line 101 open and restore the timer 2T.

In Fig. 2, when contacts 1DB1 open, they open the armature shunt circuits, or the dynamic braking circuits, as the case may be, of the motors 10—11—12—13. The contacts S1, S2, S3 are also opened to disconnect or isolate their armatures from each other. The four armatures are thus isolated with only three contacts S1, S2, S3 so that it is unnecessary to provide a fourth contact in the line 97 of motor 13.

In Fig. 2, if either one of the four motors should become overloaded, its corresponding overload contactor 1OL, 2OL, 3OL, or 4OL, will operate opening its contacts 1OL1, 2OL1, 3OL1, or 4OL1. And again in Fig. 2, if either of the four shunt fields 27 to 30 should fail, the corresponding contactor in the field energizing circuits, namely the contactors 1FL, 2FL, 3FL, or 4FL, would be restored and open the corresponding contacts 1FL1, 2FL1, 3FL1, or 4FL1. In Fig. 3, therefore, the purpose of these contacts in series in line 80 becomes apparent. Upon either overload or field failure of any one of the motors, contactor SR will be de-energized and open its contacts SR2 cutting off potential from the supplemental main 84, de-energizing contactors 1CR, 2CR, and M, opening contacts M1 in Fig. 2, and cutting off power to all of the motors, and starting dynamic braking to stop the motors.

In Fig. 3, contactor 79 is shown as a push button contactor and may be opened by hand at any time to open line 80, and again, as above described, to cut off power to the motors and stop them; and this contactor may be considered as symbolizing any kind of automatic stop contactor operated to be opened by suitable or well known means upon the occurrence of any abnormal condition of the apparatus. Any desired number of such contactors as 79 may be provided as different points on the apparatus.

As set forth in the foregoing description, certain interlocks have been provided by means of contacts operated by the several electromagnetic contactors to insure or compel the operation of the contactors in a predetermined sequence.

Another such interlock is provided by the contacts 5A2 of the contactor 5A and shown in Fig. 3 in the line 138 by which contactor 1CR is energized; and because of which, a cycle of operations cannot be initiated by operation of contactor 1CR as described until all of the accelerating resistance 42 of Fig. 2 has been cut back into the motor circuits by the restoring of contactor 5A and closure of said contacts 5A2.

Additional interlock contacts which might otherwise be necessary are avoided and simplification effected, by prescribing a mode of operation for the controller 78, Fig. 3.

As stated, for full speed running, the controller 78 is moved to the "Start" position while contactor 82 is held operated; and then contactor 82 is restored and the controller moved to "Run" position.

For full speed running conditions to obtain, contactor 3CR, Fig. 3, must be operated. It cannot operate unless contacts 2DB3 in line 112, Fig. 3, are closed; and contacts 2DB3 cannot be closed until contactor 2DB line 94 is operated; and contactor 2DB cannot be operated except through contacts 1CR6 in line 94 when contactor 1CR is operated.

The operator is thus compelled to hold the controller 78 in "Start" position, and thereby keep contactor 1CR closed, long enough for contactors 2DB and 3CR to operate, before he restores contactor 82.

In Fig. 3, the jog contactor 82 and controller 78 are shown diagrammatically. In practice, the jog contactor is operated by a foot rail extending along the front of the machine accessible to the operator at any point, and is spring restored; these parts being symbolized by the bar 139 and spring 140.

The controller 78 is operated by a hand rail extending along the front of the machine symbolized by the bar 141; and is biased to the "Run" position by springs, symbolized at 142 and 143. The operator pulls the hand rail to "Start" position, releases it to return to "Run" position, and pushes it back to "Stop" position. As a safety measure, the hand rail is so located that if the operator should slip or fall forwardly toward the machine his body would push the hand rail to "Stop" position.

The control system above described is energized by substantially constant voltage on the mains 48—49, Fig. 2.

Systems of this general class are sometimes energized from a generator provided for the purpose and with its output voltage variable and adjustable at its field excitation.

Some of the improvements described hereinbefore are applicable to such variable voltage systems. Particularly is this true of the described means for dynamically braking and stopping the motors when running the motors when running at full speed; and the claims hereof are intended to cover the claimed improvements, whether embodied in a constant voltage system or in a variable voltage system.

I claim:

1. In a control system for the plurality of shunt-field and series-field excited motors of a multiple-die-block wire-drawing machine of the type having wire-operated dancer-roll mechanisms; a source of potential; a common motor-accelerating resistance; normally open main motor circuits comprising conductors for connecting each of the motor armatures and its series field to be energized from the potential source through the common accelerating resistance; a common armature shunt resistance; normally open motor shunt loop circuit comprising conductors for connecting the armatures of the motors in respective loops through the common armature shunt resistance; normally open shunt field full energizing circuits comprising conductors for connecting the motor shunt fields to be energized from the potential source; shunt field regulating rheostats at least some of which are controlled by dancer-roll mechanisms; normally ineffective shunt field regulating circuits comprising conductors for connecting the shunt fields to be energized from the potential source through the regulating rheostats respectively; a timing contactor; operator's contactor means; control means comprising control circuits and contactors, rendered effective upon operation of the operator's contactor means: to close the normally open main motor circuits; to close the normally open motor shunt loop circuits; to close the normally open shunt field full energizing circuits; and to actuate the timing contactor, to cause it to operate after a time interval; and comprising other control circuits and contactors rendered effective by operation of the timing contactor: to open the shunt field full energizing circuits; to render effective the shunt field regulating circuits; and to cut out a step of the accelerating resistance.

2. In a control system for the plurality of shunt-field and series-field excited motors of a multiple-die-block wire-drawing machine of the type having wire-operated dancer-roll mechanisms; a source of potential; a common motor-accelerating resistance; normally open main motor circuits comprising conductors for connecting each of the motor armatures and its series field to be energized from the potential source through the common accelerating resistance; a common armature shunt resistance; normally open motor shunt loop circuits comprising conductors for connecting the armatures of the motors in respective loops through the common armature shunt resistance; normally open shunt field full energizing circuits comprising conductors for connecting the motor shunt fields to be energized from the potential source; shunt field regulating rheostats at least some of which are controlled by dancer-roll mechanisms; normally ineffective shunt field regulating circuits comprising conductors for connecting the shunt fields to be energized from the potential source through the regulating rheostats respectively; a timing contactor; operator's contactor means; control means comprising control circuits and contactors, rendered effective upon operation of the operator's contactor means: to close the normally open main motor circuits; to close the normally open motor shunt loop circuits; to close the normally open shunt field full energizing circuits; and to actuate the timing contactor, to cause it to operate after a time interval; and comprising other control circuits and contactors rendered effective by operation of the timing contactor: to open the shunt field full energizing circuits; to render effective the shunt field regulating circuits; and to cut out a step of the accelerating resistance; to thereby accelerate the motors at high torque up to a limited predetermined speed; said control means rendered effective upon restoring of the operator's contactor means: to open the main motor circuits; to thereby cause the motors to be dynamically braked by the motor shunt loop circuits; to cut out a portion of the common armature shunt resistance to magnify the braking effect; to render effective the shunt field regulating circuits; and to close the shunt field full energizing circuits; to stop the motors.

3. In a control system for the plurality of shunt-field and series-field excited motors of a multiple-die-block wire-drawing machine of the type having wire-operated dancer-roll mechanisms; a source of potential; a common motor-accelerating resistance; normally open main motor circuits comprising conductors for connecting each of the motor armatures and its series field to be energized from the potential source through the common accelerating resistance; a common armature shunt resistance; normally open motor shunt loop circuits comprising conductors for connecting the armatures of the motors in respective loops through the common armature shunt resistance; normally open shunt field full energizing circuits comprising conductors for connecting the motor shunt fields to be energized from the potential source; shunt field regulating rheostats at least some of which are controlled by dancer-roll mechanisms; normally ineffective shunt field regulating circuits comprising conductors for connecting the shunt fields to be energized from the potential source through the regulating rheostats respectively; a first and a second timing contactor; operator's contactor means; control means comprising control circuits and contactors, rendered effective upon operation of the operator's contactor means: to close the normally open main motor circuits; to close the normally open motor shunt loop circuits; to close the normally open shunt field full energizing circuits; and to actuate the first timing contactor, to cause it to operate after a time interval; and comprising other control circuits and contactors rendered effective by operation of the first timing contactor: to open the shunt field full energizing circuits; to render effective the shunt field regulating circuits; and to cut out a step of the accelerating resistance; and to actuate the second timing contactor to cause it to operate after a second time interval; and comprising other control circuits and contactors rendered effective by operation of the second timing contactor: to open the motor shunt loop circuits, and to cut out the rest of the accelerating resistance in successive timed steps, to accelerate the motors to full speed.

4. A control system to quickly decelerate and stop the plurality of shunt field and series field excited motors driving a multiple-die-block wire-drawing machine with the shunt fields controlled by field rheostats and at least some of the rheostats controlled by wire operated dancer rolls, and with the motors and series fields connected in parallel circuits energized from a source of potential; the system comprising a common armature shunt resistance; normally open motor shunt loop circuits comprising conductors for connecting the armatures of the motors in respective loops through the common armature shunt resistance; shunt field resistances for the shunt fields respectively; normally open bridging circuits comprising conductors for connecting the shunt field resistances in parallel with the field rheostats; normally open shunt field full energizing circuits comprising conductors for connecting the shunt fields to be energized from the potential source; a timing electromagnetic contactor energized across the armature of one of the motors and being normally operated and having normally open contacts; operator's contactor means; control means comprising control circuits and contactors rendered effective upon operation of the operator's contactor means: to cut off the motor armatures and series fields from the source; to close the normally open bridging circuits; to close the normally open shunt loop circuits to cause the motors to be dynamically braked by current through the common armature shunt resistance; to thereby cause the motors to slow down to effect restoring of the normally operated timing contactor and closing of its contacts; and comprising other control circuits and contactors rendered effective upon closing of the timing contactor contacts to: cut out a part of the common armature shunt resistance, and to close the shunt field full energization circuits.

OSWALD M. BUNDY.

REFERENCES CITED

The following references are of record in the file of this patent:

UNITED STATES PATENTS

| Number | Name | Date |
| --- | --- | --- |
| 1,767,606 | Mortensen | June 24, 1930 |